(12) United States Patent
Minami (10) Patent No.: US 9,677,465 B2
(45) Date of Patent: *Jun. 13, 2017

(54) NATURAL GAS ENGINE AND OPERATION METHOD FOR NATURAL GAS ENGINE

(71) Applicant: ISUZU MOTORS LIMITED, Tokyo (JP)

(72) Inventor: Toshitaka Minami, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 133 days.

This patent is subject to a terminal disclaimer.

(21) Appl. No.: 14/646,963

(22) PCT Filed: Nov. 8, 2013

(86) PCT No.: PCT/JP2013/080278
§ 371 (c)(1),
(2) Date: May 22, 2015

(87) PCT Pub. No.: WO2014/084023
PCT Pub. Date: Jun. 5, 2014

(65) Prior Publication Data
US 2015/0300247 A1    Oct. 22, 2015

(30) Foreign Application Priority Data

Nov. 30, 2012    (JP) .................................. 2012-262543

(51) Int. Cl.
*F02M 21/02*    (2006.01)
*F02B 43/10*    (2006.01)
(Continued)

(52) U.S. Cl.
CPC ............... *F02B 43/10* (2013.01); *F02B 3/08* (2013.01); *F02D 19/08* (2013.01); *F02D 19/10* (2013.01);
(Continued)

(58) Field of Classification Search
CPC .... F02D 19/0647; F02D 19/10; F02D 41/401; F02D 19/061; F02D 19/08; F02D 21/08;
(Continued)

(56) References Cited

U.S. PATENT DOCUMENTS 3,016,886 A    1/1962    Benz et al.
5,035,206 A *  7/1991    Welch .................. F02B 7/06
                                           123/27 GE
(Continued)

FOREIGN PATENT DOCUMENTS

CA    2 442 336 A1    12/2003
CN    101078376 A     11/2007
(Continued)

OTHER PUBLICATIONS

Extended European Search Report dated Jul. 14, 2016 in corresponding European Patent Application No. 13858625.0.
(Continued)

*Primary Examiner* — Marguerite McMahon
*Assistant Examiner* — Tea Holbrook
(74) *Attorney, Agent, or Firm* — Staas & Halsey LLP (57) ABSTRACT

A natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without the use of a spark ignition system. The engine has a mechanism that introduces exhaust gas into a cylinder during an intake stroke.

5 Claims, 6 Drawing Sheets

(51) Int. Cl.
*F02D 19/10* (2006.01)
*F02D 19/08* (2006.01)
*F02B 3/08* (2006.01)
*F02D 41/00* (2006.01)
*F02M 26/01* (2016.01)
*F02M 26/05* (2016.01)
*F02D 13/02* (2006.01)

(52) U.S. Cl.
CPC ......... *F02D 19/105* (2013.01); *F02D 41/006* (2013.01); *F02D 41/0027* (2013.01); *F02D 41/0057* (2013.01); *F02M 26/01* (2016.02); *F02B 2043/103* (2013.01); *F02D 13/0246* (2013.01); *F02D 13/0273* (2013.01); *F02D 41/0025* (2013.01); *F02D 2041/001* (2013.01); *F02M 26/05* (2016.02); *Y02T 10/36* (2013.01); *Y02T 10/47* (2013.01)

(58) Field of Classification Search
CPC ............. F02D 13/0246; F02D 13/0273; F02D 19/105; F02D 2041/001; F02D 41/0025; F02D 41/0027; F02D 41/0057; F02D 41/006; F02B 3/06; F02B 2043/103; F02B 1/04; F02B 17/005; F02B 1/12; F02B 47/08; F02B 3/08; F02B 43/10; F02M 26/01

See application file for complete search history.

(56) References Cited

U.S. PATENT DOCUMENTS

| | | | |
|---|---|---|---|
| 6,230,683 B1* | 5/2001 | zur Loye | F02B 1/12 123/27 GE |
| 2001/0017127 A1 | 8/2001 | Flynn et al. | |
| 2002/0020388 A1* | 2/2002 | Wright | F02B 1/12 123/304 |
| 2002/0078918 A1 | 6/2002 | Ancimer et al. | |
| 2002/0174648 A1 | 11/2002 | Minami | |
| 2005/0224060 A1* | 10/2005 | Hill | F02D 19/0689 123/568.21 |
| 2009/0120385 A1* | 5/2009 | Munshi | C10L 3/06 123/3 |
| 2009/0266345 A1* | 10/2009 | Sasaki | F02D 13/0261 123/568.22 |
| 2012/0160221 A1* | 6/2012 | Munshi | C10L 3/06 123/575 |
| 2012/0266846 A1* | 10/2012 | Kilbourne | F02M 43/00 123/478 |
| 2012/0310509 A1* | 12/2012 | Pardo | F02D 19/061 701/104 |
| 2013/0213363 A1* | 8/2013 | Pruemm | F02D 41/3011 123/491 |
| 2014/0034024 A1 | 2/2014 | Nakajima | |
| 2014/0069384 A1* | 3/2014 | Suzuki | F02D 41/403 123/445 |
| 2015/0315986 A1* | 11/2015 | Minami | F01N 3/035 60/274 |

FOREIGN PATENT DOCUMENTS

| | | |
|---|---|---|
| EP | 1 260 684 | 11/2002 |
| EP | 1 939 422 A1 | 7/2008 |
| EP | 2 136 059 | 12/2009 |
| EP | 2 700 803 | 2/2014 |
| EP | 2 708 722 | 3/2014 |
| GB | 967268 | 8/1964 |
| JP | 8-158980 | 6/1996 |
| JP | 2002-349241 | 12/2002 |
| JP | 3959600 | 8/2007 |
| JP | 2012-57471 | 3/2012 |
| WO | 01/86128 A2 | 11/2001 |
| WO | 2012/021990 A1 | 2/2012 |
| WO | WO 2012/144051 A1 | 10/2012 |
| WO | WO 2012/157041 A1 | 11/2012 |

OTHER PUBLICATIONS

International Search Report mailed on Dec. 24, 2013 in corresponding International Patent Application No. PCT/JP2013/080278.
Patent Abstracts of Japan, Publication No. 2012-57471, published Mar. 22, 2012.
Patent Abstracts of Japan, Publication No. 8-158980, published Jun. 18, 1996.
Espacenet English Language Abstract for JP 3959600, published Aug. 15, 2007.
International Search Report mailed on Feb. 18, 2014 for International Patent Application No. PCT/JP2013/080279.
Extended European Search Report dated Aug. 5, 2016 in European Patent Application No. 13858654.0.
Office Action for U.S. Appl. No. 14/648,023, issued Oct. 6, 2016.
U.S. Appl. No. 14/648,023, filed May 28, 2015, Toshitaka Minami, Isuzu Motors Limited.
Abstract of WO 2008/080331 A1 corresponding to Chinese Publication No. 101078376 A, Published Nov. 11, 2007.

* cited by examiner

NATURAL GAS ENGINE AND OPERATION METHOD FOR NATURAL GAS ENGINE

CROSS-REFERENCE TO RELATED APPLICATIONS

This application is a U.S. National Stage Application, which claims the benefit under 35 U.S.C. §371 of PCT International Patent Application No. PCT/JP2013/080278, filed Nov. 8, 2013, which claims the foreign priority benefit under 35 U.S.C. §119 of Japanese Patent Application No. 2012-262543, filed Nov. 30, 2012, the contents of which are incorporated herein by reference.

TECHNICAL FIELD

The present invention relates to a natural gas engine including a high-efficiency combustion system for combusting natural gas fuel by compression ignition using a hypergolic fuel source such as diesel oil without the use of a spark ignition system, and also relates to an operation method for a natural gas engine.

BACKGROUND ART

Figure 5:
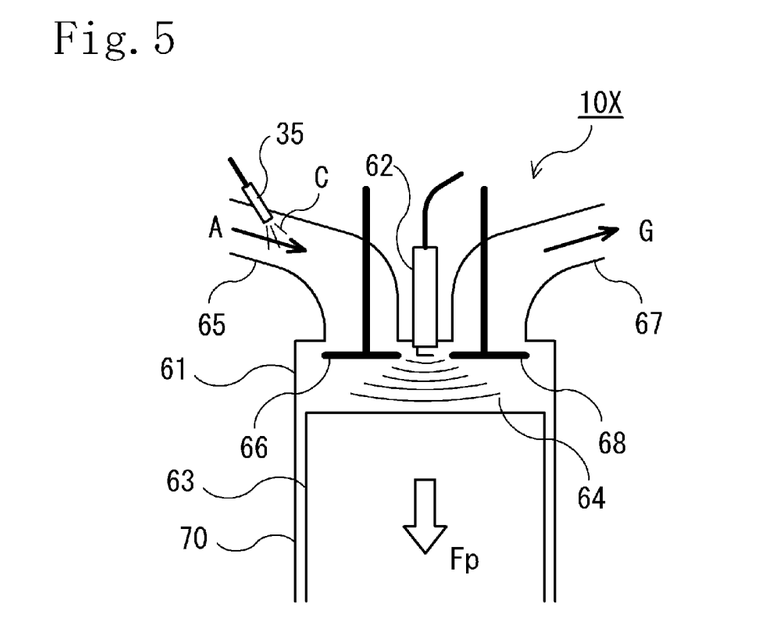
FIG. 5 is a diagram for explaining normal ignition and a combustion state of natural gas fuel in a natural gas engine according to a conventional technology.

As shown in FIG. 5, in a natural gas engine (CNG engine) 10X according to a conventional technology, natural gas fuel C compressed by a piston 63 is ignited by spark ignition using an ignition plug 62 provided in a cylinder head 61, and the natural gas fuel C is combusted.

The natural gas fuel C is injected into intake air A by a natural gas fuel jet injector (natural gas fuel injection device) 35 provided in an intake system passage 65 communicated with a combustion chamber 64 formed between the cylinder head 61 and the top of the piston 63, and is taken into the combustion chamber 64 together with the intake air A during an intake stroke in which an intake valve 66 is opened. The natural gas fuel C is ignited by electric spark of the ignition plug 62 disposed in the upper center of the combustion chamber 64. Although just an image, the combustion propagates in layers as indicated by thin lines. Then, combustion gas generated by the combustion does its work while pressing down the piston 63 during an expansion stroke involving expansion of the combustion gas. Thereafter, the combustion gas (exhaust gas) G is discharged into an exhaust system passage 67 during an exhaust stroke in which a next exhaust valve 68 is opened.

In the case of a small engine with low output or a small cylinder bore (cylinder hole) diameter or in the case of an engine in which the natural gas fuel C is readily combusted by lean combustion in a high oxygen region, the natural gas fuel C is combusted by such layered combustion so as to propagate all over the combustion chamber 64 from approximately the center of the combustion chamber 64. Thus, the force pressing down the piston 63 becomes uniform, and pressing force Fp is directed along the central axis of the piston 63 as a whole. As a result, the piston 63 is smoothly reciprocated.

Figure 6:
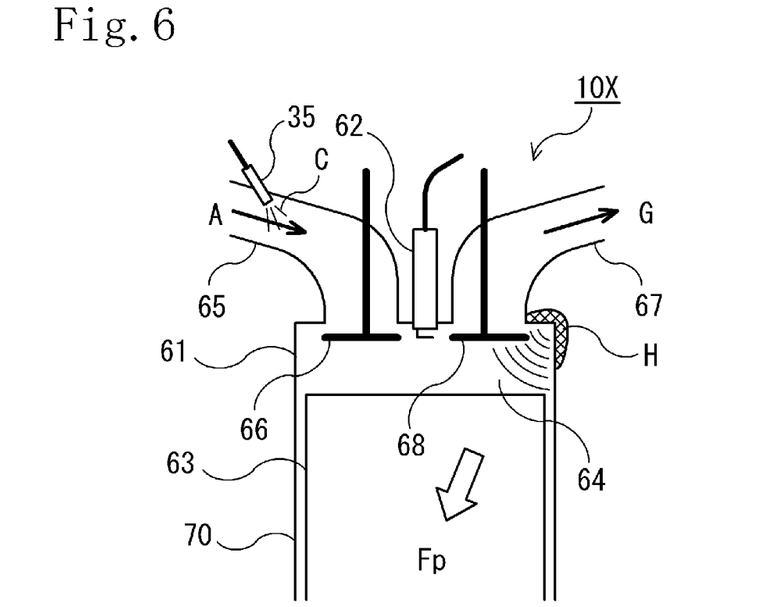
FIG. 6 is a diagram for explaining detonation (abnormal combustion) of the natural gas fuel in the natural gas engine according to the conventional technology.

However, in the case of a large engine with high output or a large cylinder bore diameter, high-temperature combustion gas G flows out toward the exhaust system passage 67 in the engine 10X. Meanwhile, since low-temperature intake air A flows into the intake system passage 65, the temperature on the exhaust system passage 67 side gets higher than that on the intake system passage 65 side. Particularly, a portion H indicated by cross-hatching in FIG. 6 is likely to be heated to a high temperature. For this reason, the natural gas fuel C is ignited by contacting with the high-temperature portion H before entering a combustion stroke, rather than being ignited by ignition of the ignition plug 62, resulting in a phenomenon called detonation (abnormal combustion) in which the combustion propagates all over the combustion chamber 64 from the high-temperature portion H side. When such a phenomenon occurs, the combustion propagates all over the combustion chamber 64 from one of the corners thereof. For this reason, the force pressing down the piston 63 becomes non-uniform, and the pressing force Fp is directed obliquely to the central axis direction of the piston 63 as a whole. As a result, the piston 63 partially hits against the cylinder 70, and can no longer be smoothly reciprocated, leading to engine trouble. The detonation is one of the causes of knocking.

Meanwhile, when the exhaust gas is subjected to after-treatment using a three-way catalyst, in order to reduce NOx in the exhaust gas, an exhaust gas treatment device carrying the three-way catalyst is provided in an exhaust passage to reduce and remove NOx in the exhaust gas. As to the three-way catalyst, catalyst performance thereof is lowered in an air-fuel ratio lean region with much oxygen. Thus, the three-way catalyst is preferably in an air-fuel ratio rich region with low oxygen concentrations in the exhaust gas. Therefore, inside the cylinder, stoichiometric combustion (combustion with a stoichiometric ratio: complete combustion that leaves no oxygen after combustion) or rich combustion (combustion close to the stoichiometric ratio and with low oxygen concentrations) is performed. Thus, the stoichiometric combustion is performed in the cylinder by controlling the amount of intake air into the cylinder using an intake throttle valve provided in the intake passage and supplying intake air with an oxygen level required and sufficient to combust the natural gas fuel.

Since an air-fuel mixture of the intake air A and the natural gas fuel C is not readily combusted, unlike lean combustion, also in such a case of stoichiometric combustion or rich combustion, the combustion starts from the high-temperature portion H on the exhaust system passage 67 side, making the detonation likely to occur.

As described above, considering higher output and increase in size of the natural gas engine or rich combustion therein, the detonation problem needs to be resolved. It is also required to resolve a problem of heat damage to the ignition plug, in which the ignition plug is damaged by heat in an ignition plug ignition system. Meanwhile, when there is one ignition plug for spark ignition, only one ignition source makes it difficult to perform reliable ignition for each cycle, leading to a problem of poor combustion efficiency. Such poor combustion efficiency requires a large amount of fuel to obtain a desired engine output, resulting in an increase in amount of heat to be generated. As a result, various durability problems are likely to occur, such as fuel consumption, heat damage to an electrode portion of the ignition plug and heat damage to exhaust system parts.

As measures against such problems, there has been proposed a fuel control device for an internal combustion engine as described in Japanese patent application Kokai publication No. 2012-57471, for example. In the fuel control device, CNG (natural gas) fuel is injected into an intake passage by a CNG injector (CNG fuel injection device) and diesel oil is injected into a combustion chamber by a diesel oil injector (diesel fuel injection device). By mixing the CNG fuel with the diesel oil having high compression ignition properties, the CNG is combusted using the diesel oil as an ignition source. Moreover, a ratio of the CNG to the diesel oil is changed based on the maximum pressure during combustion in a combustion chamber.

Figure 7:
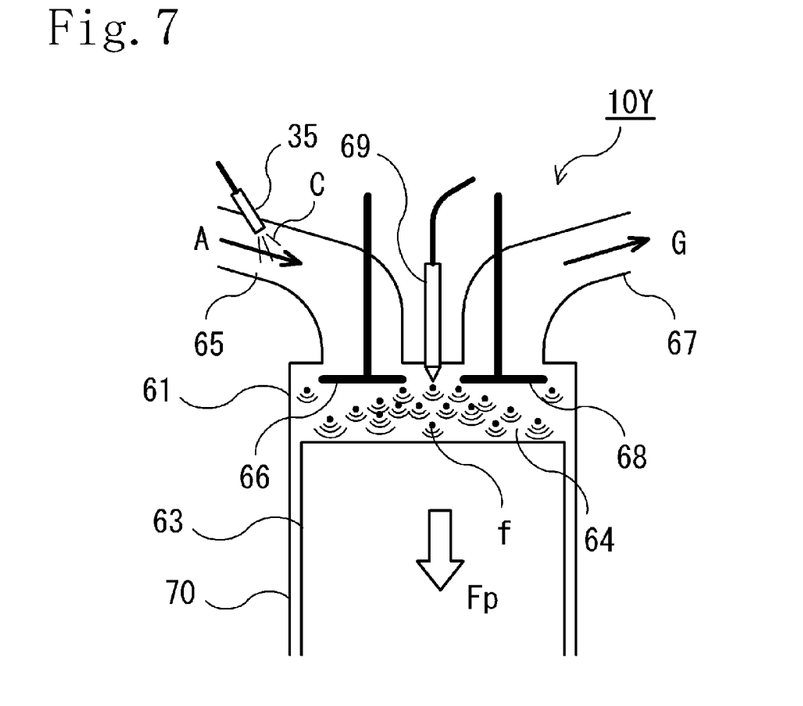
FIG. 7 is a diagram for explaining ignition and a combustion state of fuel in a natural gas engine simultaneously using diesel fuel according to the conventional technology.

As shown in FIG. 7, in a natural gas engine 10Y that simultaneously uses such diesel fuel, diesel fuel f is injected by a diesel fuel jet injector (diesel fuel injection device) 69 during a compression stroke to compress an air-fuel mixture of natural gas fuel C and intake air A. Then, as the fuel spreads inside the combustion chamber 64, the temperature of the air-fuel mixture is increased by adiabatic compression of the air-fuel mixture. When the temperature of the air-fuel mixture exceeds an ignition temperature of the diesel oil, the diesel fuel f starts to be combusted by compression ignition, and the natural gas fuel C around the ignition source is also combusted. At this combustion start point, the diesel fuel f is spreading inside the combustion chamber 64. Thus, multipoint ignition can prevent ignition from an exhaust system high-temperature portion. Accordingly, combustion is performed in the entire combustion chamber 64, and thus approximately uniform force is applied to the top of the piston 63. Therefore, pressing force Fp pressing down the piston 63 is set approximately in a central axis direction of the piston 63. Thus, the piston 63 is smoothly reciprocated. Accordingly, in the engine using both the diesel fuel and the natural gas fuel, detonation can be prevented. Also, since no ignition plug is used, no heat damage to the ignition plug occurs.

Figure 8:
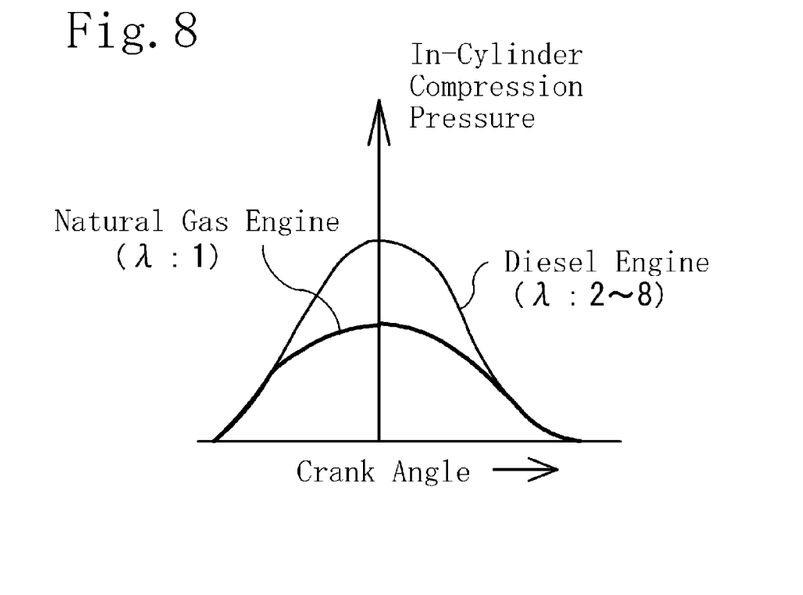
FIG. 8 is a diagram schematically showing comparison between a compression pressure in the natural gas engine and a compression pressure in a general diesel engine.

However, the natural gas engine simultaneously using the diesel fuel also has the following problem. Specifically, as shown in FIG. 8, compared with a diesel engine according to a conventional technology, which is operated with an excess air ratio $\lambda$ of 2 to 8, an intake air amount is significantly reduced in a natural gas engine in which stoichiometric combustion is performed with an excess air ratio $\lambda$ of 1. As a result, the compression pressure in the cylinder is lowered, and the temperature rise of the air-fuel mixture in the cylinder by the adiabatic compression is also reduced. Particularly, in the case of a low load operation region with a small engine output (horsepower), when the intake air amount is reduced to maintain the stoichiometric combustion, with reduction in fuel, the compression pressure in the cylinder is significantly lowered, leading to a problem of unstable combustion. Such a problem needs to be resolved.

With regard to such problems, the inventors of the present invention have proposed a diesel engine including an exhaust gas purification device for the purpose of reliably and continuously combusting PM collected by a DPF in a wide operation region of the diesel engine, as described in Japanese patent application Kokai publication No. 2002-349241. In the diesel engine, an exhaust cam is formed in two stages including an exhaust gas introduction cam, or an exhaust gas introduction valve is provided and an exhaust gas introduction mechanism is provided to introduce exhaust gas into a cylinder during an intake stroke. When an exhaust temperature range is a low temperature range, an intake shutter, an exhaust shutter and the exhaust gas introduction mechanism are operated to increase the exhaust gas temperature (in-cylinder temperature).

The diesel engine described above is an engine using only diesel oil as fuel, but is an engine capable of stably igniting the fuel in the cylinder, even when an intake air amount is reduced by an intake throttle valve in a low load operation condition of the engine, by using the exhaust gas introduction mechanism that increases the in-cylinder temperature by causing some of the exhaust gas in the exhaust passage to flow back into the cylinder during the intake stroke of the engine.

PRIOR ART DOCUMENT

Patent Document 1: Japanese patent application Kokai publication No. 2012-57471
Patent Document 2: Japanese patent application Kokai publication No. 2002-349241

SUMMARY OF THE INVENTION

In consideration of the above situations, the inventors of the present invention have conceived the present invention by acquiring the knowledge that the above problems of the natural gas engine can be resolved by incorporating the exhaust gas introduction mechanism to introduce exhaust gas into the cylinder during the intake stroke into the natural gas engine.

It is an object of the present invention to provide a natural gas engine and an operation method for the natural gas engine, which are capable of igniting natural gas fuel in a reliable and stable manner and performing highly efficient combustion using a small amount of fuel and a small amount of intake air even during a low load operation condition, stoichiometric combustion, or rich combustion in an engine including a natural gas fuel injection device that injects diesel fuel serving as an ignition source into a combustion chamber and injects natural gas fuel into an intake system passage.

A natural gas engine according to the present invention to achieve the above object includes an exhaust gas introduction mechanism that introduces exhaust gas into a cylinder during an intake stroke in a natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel injected into the cylinder without the use of a spark ignition system.

Note that the exhaust gas introduction mechanism described above can adopt any of the following configurations, which are already well-known technologies. As one of the configurations, in an exhaust cam that actuates an exhaust valve, an exhaust gas introduction cam profile having a phase angle of approximately 90° is formed in addition to a normal cam profile that opens the exhaust valve during a normal exhaust stroke. The exhaust gas introduction cam profile can be actuated according to an engine operation condition. Thus, by lifting and opening the exhaust valve by about 1 mm to 3 mm during the intake stroke, the inside of a cylinder and an exhaust system passage are communicated with each other to introduce the exhaust gas during the intake stroke.

As the other configuration, an exhaust gas introduction valve using an electromagnetic solenoid to actuate an on-off valve is provided separately from the exhaust valve, and a drive signal is given to the electromagnetic solenoid according to the engine operation condition. Thus, by lifting and opening the exhaust gas introduction valve during the intake stroke, the inside of the cylinder and the exhaust system passage are communicated with each other to introduce the exhaust gas during the intake stroke.

Note that the present invention does not have to be limited to the above two configurations, but may adopt a configuration having a function to introduce the exhaust gas into the cylinder during the intake stroke, besides the configurations described above.

According to the configurations described above, the operation of the exhaust gas introduction mechanism can introduce high-temperature exhaust gas into the cylinder immediately after combustion by allowing the high-temperature exhaust gas in the exhaust system passage to appropriately flow back into the cylinder during the intake stroke. Thus, the temperature of an air-fuel mixture of diesel fuel, natural gas fuel, intake air and exhaust gas inside the cylinder can be increased. Compared with EGR gas introduction in which the temperature is lowered through an EGR passage including an EGR cooler, the exhaust gas introduction described above significantly increases the effect of increasing an in-cylinder temperature, since the high-temperature exhaust gas immediately after combustion is introduced.

As a result, stable compression combustion can be performed even with a small amount of diesel fuel, and the natural gas fuel can also be combusted in a stable manner using the combustion of the diesel fuel as an ignition source. Accordingly, stable combustion with high combustion efficiency can be realized. Moreover, since the amount of diesel fuel required for ignition is reduced, only a small amount of diesel fuel to be consumed is required. Furthermore, an amount of heat generated by combustion of the fuels is reduced as a whole. As a result, the amount of heat propagated to the exhaust system passage is reduced, leading to reduction in heat damage caused by the heat. Thus, durability of exhaust system parts in the engine is improved.

Moreover, the operation of the exhaust gas introduction mechanism can quickly increase an in-cylinder temperature even at the start-up when the engine is still cold. Thus, startability is improved. Also, at the start-up of the engine, the engine can be started with a small amount of diesel fuel. Thus, accidental fires and unburned hydrocarbon (unburned HC) emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel is readily ignited even during a low load operation condition, thus enabling stable ignition with a small amount of diesel fuel. Since stable combustion can be performed with a small amount of fuels, ride quality (drivability) can be improved while reducing engine vibration. Also, the amount of exhaust gas can be reduced during the low load condition.

When an exhaust gas purification system is adopted, in which a bypass passage is provided in the exhaust passage and a low-capacity DPF for the low load condition is provided, the capacity of the DPF provided in the bypass passage can be reduced to realize a compact size. Therefore, the compact DPF can be disposed in a high-temperature portion closer to the engine main body. Thus, the amount of PM generated by diesel combustion in the exhaust gas emitted into the atmosphere can be reduced. Note that, in the configuration of the exhaust gas purification system described above, the exhaust gas is controlled to pass through a high-capacity DPF on the downstream side, which is provided in the exhaust passage, rather than through the bypass passage, in a high load operation condition with a high exhaust temperature. Thus, exhaust resistance is small, and soot is removed by the DPF.

In the natural gas engine described above, an amount of diesel fuel to be injected into the cylinder is set to a diesel fuel amount for idling across the whole operation region of the engine, and engine output is increased and decreased by increasing and decreasing the amount of the natural gas fuel. In a diesel engine including the exhaust gas introduction mechanism and using diesel fuel, stable combustion can be maintained in an idling condition from the beginning. Thus, the use of the combustion of the diesel fuel for the ignition of the natural gas fuel enables reliable compression ignition of the diesel fuel and also enables the natural gas fuel to be combusted with the minimum amount of intake air and high combustion efficiency, regardless of the amount of natural gas fuel, through a very simple control in which the diesel fuel amount is constant compared with a control in which a ratio of the natural gas fuel to the diesel fuel is changed according to the engine operation region. Note that the position of an intake throttle valve in this case is controlled by measuring the air-fuel ratio, excess air ratio $\lambda$ and oxygen concentrations in the exhaust gas, and determining a stoichiometric ratio for stoichiometric combustion.

Therefore, since the intake air amount is small with respect to the ratio of the amount of the fuels, the exhaust gas temperature can be increased. Thus, exhaust gas purification performance of the exhaust gas purification device (after-treatment device) provided in the exhaust passage can be improved. Moreover, since the intake air amount is small, the exhaust gas amount is also reduced. Accordingly, only a low capacity is required for the exhaust gas purification device, and thus a compact size can be realized.

The natural gas engine described above adopts a configuration in which intake throttle control using an intake shutter provided in the intake system passage is simultaneously performed in an operation region where the exhaust gas introduction mechanism is actuated. With such a configuration, the intake air amount (fresh air amount) can be reduced to an amount that enables stoichiometric combustion by actuating the intake shutter in a closing direction to reduce the intake air, together with the operation of the exhaust gas introduction mechanism, and the pressure on the intake system passage side can be lowered. Thus, the exhaust gas can be allowed to more efficiently flow back into the cylinder. As a result, the in-cylinder temperature can be further increased, and the combustion efficiency can be further improved.

Note that, in the diesel engine according to the conventional technology, in which diesel fuel is combusted, no intake shutter (intake throttle valve) is provided, since lean combustion is usually performed. However, in the present invention, the intake shutter is provided to further increase the thermal efficiency, since the intake air amount needs to be reduced to perform stoichiometric combustion or rich combustion of the natural gas fuel. The intake shutter is used to assist the exhaust gas introduction into the cylinder.

Moreover, the natural gas engine described above adopts a configuration in which exhaust throttle control using an exhaust shutter provided in the exhaust system passage is simultaneously performed in an operation region where the exhaust gas introduction mechanism is actuated. With such a configuration, when the exhaust shutter is operated in a closing direction to reduce the exhaust gas, the pressure on the exhaust system passage side is increased, making it easier using the exhaust gas back pressure in the exhaust system passage to flow back into the cylinder. Thus, a back-flow amount can be increased, and the effect of increasing the in-cylinder temperature can be further improved.

The operation method for the natural gas engine according to the present invention to achieve the above object is an operation method for a natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without the use of a spark ignition system, the natural gas engine including an exhaust gas introduction mechanism that introduces exhaust gas into a cylinder during an intake stroke. In the method, an amount of diesel fuel to be injected into the cylinder is set to a diesel fuel amount for idling across the whole operation region of the natural gas engine, and engine output is increased and decreased by increasing and decreasing the amount of the natural gas fuel.

According to the method, the operation of the exhaust gas introduction mechanism can increase the temperature of the air-fuel mixture of diesel fuel, natural gas fuel, intake air and exhaust gas inside the cylinder, since high-temperature exhaust gas in the exhaust system passage is allowed to flow back into the cylinder during an intake stroke and the high-temperature exhaust gas immediately after combustion can be introduced into the cylinder. Thus, stable compression combustion is performed even with a small amount of diesel fuel, and the natural gas fuel can also be combusted in a stable manner. Accordingly, stable combustion can be realized. As a result, combustion efficiency is improved, and the amount of diesel fuel required for ignition is reduced. Thus, only a small amount of diesel fuel is required. Moreover, an amount of heat generated by combustion of the fuels is reduced as a whole. As a result, the amount of heat propagated to the exhaust system passage is reduced, leading to reduction in heat damage and improvement in durability.

In a diesel engine including the exhaust gas introduction mechanism and using diesel fuel, stable combustion can be maintained in an idling condition from the beginning. Thus, the use of the combustion of the diesel fuel for the ignition of the natural gas fuel enables reliable compression ignition of the diesel fuel and also enables the natural gas fuel to be combusted with the minimum amount of intake air and high combustion efficiency, regardless of the amount of natural gas fuel, through a very simple control in which the diesel fuel amount is constant compared with a control in which a ratio of the natural gas fuel to the diesel fuel is changed according to the engine operation condition. Note that the position of the intake throttle (intake shutter) in this case is controlled by measuring the air-fuel ratio, excess air ratio λ and oxygen concentrations in the exhaust gas, and determining a stoichiometric ratio for stoichiometric combustion.

Accordingly, since the intake air amount is small with respect to the ratio of the amount of the fuels, the exhaust gas temperature can be increased. Thus, exhaust gas purification performance of the exhaust gas purification device (aftertreatment device) provided in the exhaust passage can be improved. Moreover, since the intake air amount is small, the exhaust gas amount is also reduced. Accordingly, only a low capacity is required for the exhaust gas purification device, and thus a compact size can be realized.

Moreover, in the operation method for the natural gas engine described above, by simultaneously performing intake throttle control using the intake shutter provided in the intake system passage and exhaust throttle control using an exhaust shutter provided in an exhaust system passage during an operation region to actuate the exhaust gas introduction mechanism, the exhaust gas can be allowed to more efficiently flow back into the cylinder. As a result, an in-cylinder temperature can be further increased, and the combustion efficiency can be further improved.

According to the natural gas engine and the operation method for the natural gas engine according to the present invention, the operation of the exhaust gas introduction mechanism can increase the temperature of the air-fuel mixture of diesel fuel, natural gas fuel, intake air and exhaust gas inside the cylinder, since high-temperature exhaust gas immediately after combustion can be allowed to flow back during an intake stroke to be taken into the cylinder. Thus, stable compression combustion is performed even with a small amount of diesel fuel, and the natural gas fuel can also be combusted in a stable manner. Accordingly, stable combustion can be realized. As a result, combustion efficiency is improved, and the amount of diesel fuel required for ignition is reduced. Thus, only a small amount of diesel fuel is required. Moreover, an amount of heat generated by combustion of the fuels is reduced as a whole. As a result, the amount of heat propagated to the exhaust system passage is reduced, leading to reduction in heat damage and improvement in durability.

DETAILED DESCRIPTION

With reference to the drawings, description is given below of a natural gas engine and an operation method for the natural gas engine according to an embodiment of the present invention. In a natural gas engine 10 according to the embodiment of the present invention shown in FIGS. 1 and 2, an intake passage (intake system passage) 12 is connected to an intake manifold (intake system passage) 11a of an engine main body 11, an exhaust passage (exhaust system passage) 13 is connected to an exhaust manifold (exhaust system passage) 11b thereof, and an EGR passage 14 is provided, which connects the exhaust passage 13 to the intake passage 12.

Figure 1:
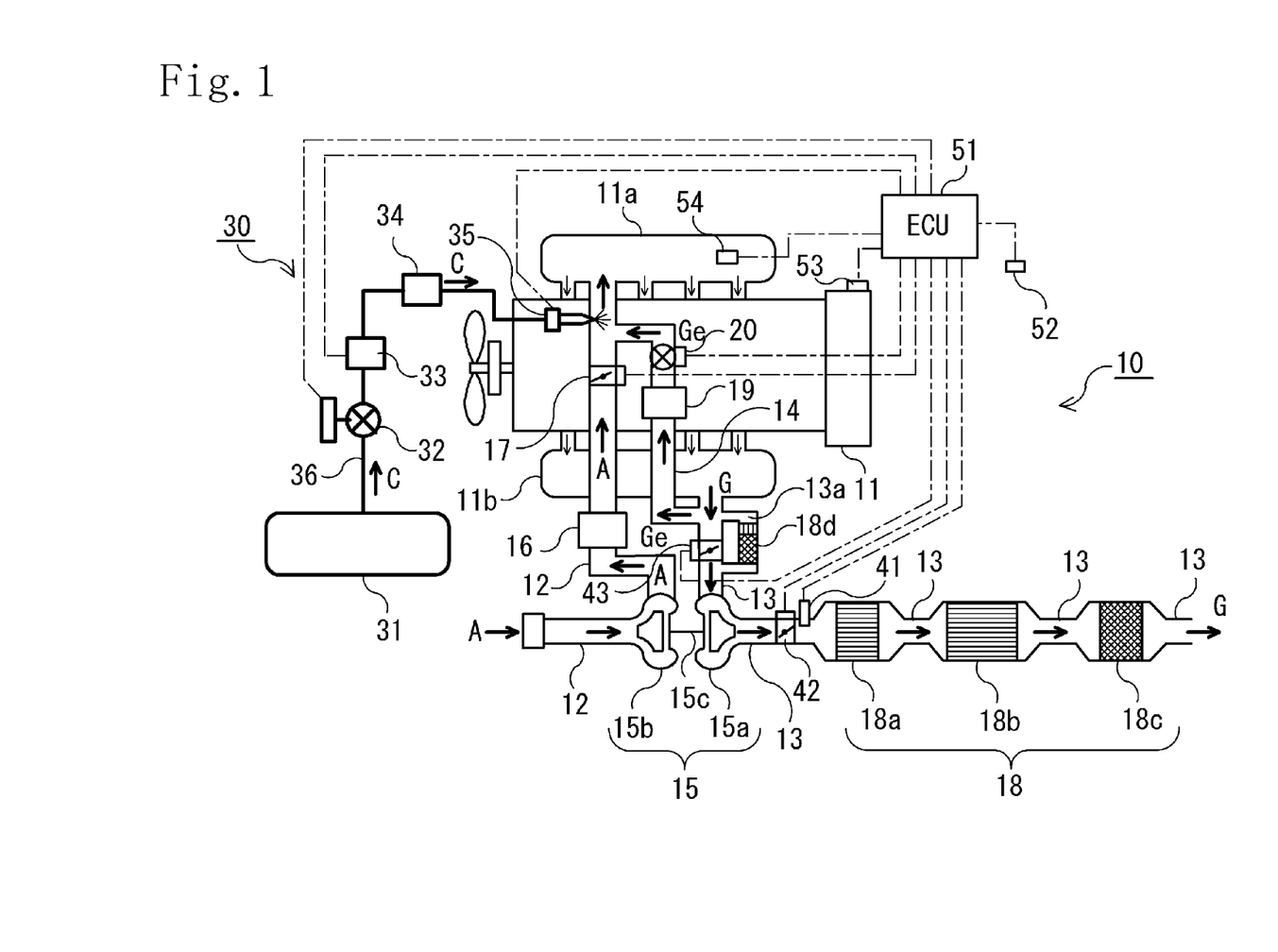
FIG. 1 is a diagram schematically showing a configuration of a natural gas engine according to an embodiment of the present invention.

There is also provided a turbo supercharger (turbocharger) 15. A turbine 15a of the turbo supercharger 15 is provided in the exhaust passage 13, and a compressor 15b thereof is provided in the intake passage 12. Through a shaft 15c connecting the turbine 15a with the compressor 15b, rotation of the turbine 15a rotated by exhaust energy of exhaust gas G is transmitted to the compressor 15b. Thus, the compressor 15b compresses intake air A.

In the intake passage 12, through which the intake air A passes, the compressor 15b, an intercooler 16 and an intake shutter (intake throttle) 17 are provided. The intake air A is compressed by the compressor 15b and cooled by the intercooler 16 to have its air density increased. Then, the intake air A is introduced into a combustion chamber 64 in a cylinder 70 shown in FIG. 2 after a flow rate thereof is controlled by the intake shutter 17.

Also, as shown in FIG. 1, in the exhaust passage 13, through which the exhaust gas G generated by combustion of diesel fuel f and natural gas fuel C passes, the turbine 15a and an exhaust gas purification device (aftertreatment device) 18 including a three-way catalyst 18a, an oxidation catalyst 18b, a DPF (diesel particulate filter) 18c and the like, are provided. Also, an exhaust shutter 42 is provided between the turbine 15a and the exhaust gas purification device 18. Moreover, some of the exhaust gas G is introduced into the EGR passage 14 as EGR gas Ge as needed, and the rest thereof is purified by the exhaust gas purification device 18 and emitted into the atmosphere after driving the turbine 15a.

Furthermore, in the EGR passage 14, through which the EGR gas Ge passes, an EGR cooler 19 that cools the EGR gas Ge and an EGR valve 20 that controls a flow rate of the EGR gas Ge are provided. After diverging from the exhaust passage 13, the EGR gas Ge is cooled by the EGR cooler 19, controlled by the EGR valve 20 for its flow rate, and then recirculated into the intake passage 12.

Figure 2:
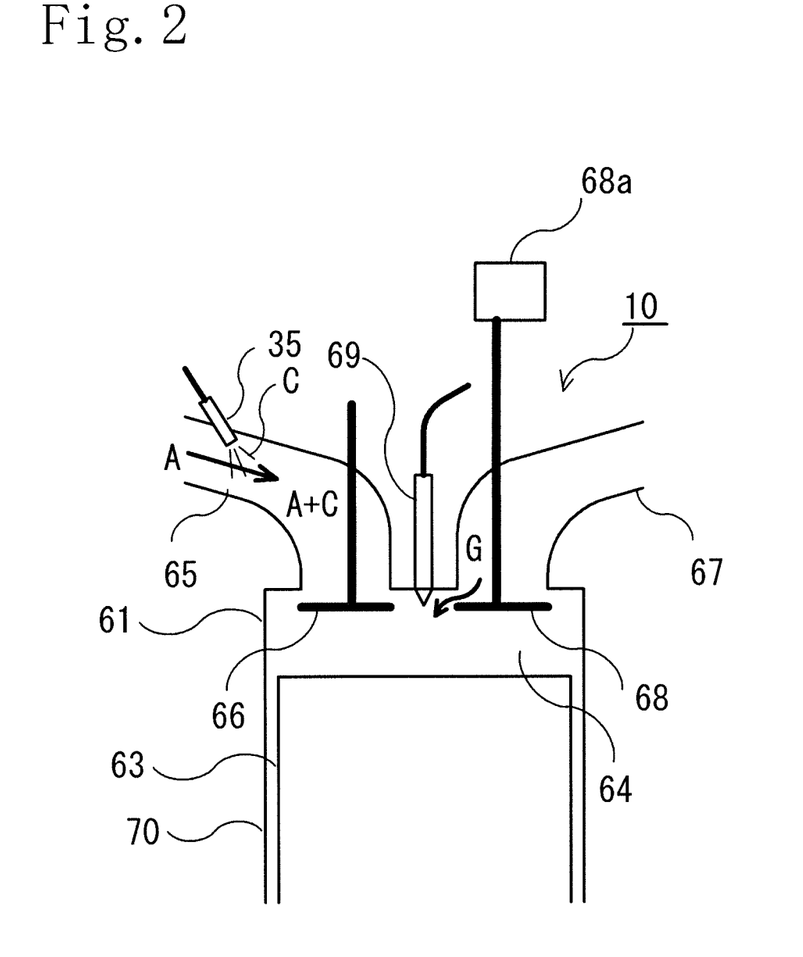
FIG. 2 is a diagram for explaining exhaust gas introduction.

The natural gas engine 10 described above includes a diesel fuel supply line (not shown) to inject the diesel fuel f into the cylinder 70 in the engine main body 11, as in the case of a diesel engine. Therefore, as in the case of a general diesel engine, the diesel fuel f is injected into the cylinder 70 from a diesel fuel injector (diesel fuel injection device) 69 as shown in FIG. 2.

Moreover, as for the engine main body 11 as well as a fuel injection system, a cooling system, and the like, the present invention includes the configuration of the general diesel engine. In addition to such a configuration, the present invention includes a natural gas supply system 30 including a natural gas tank (CNG tank) 31, an electromagnetic valve 32, a pressure regulating device (regulator) 33, a chamber 34, a CNG jet injector (natural gas fuel injection device) 35 disposed on the downstream side of the intake shutter 17 in the intake passage 12, and a CNG pipe 36 connecting those described above, as shown in FIG. 1.

With the natural gas supply system 30, the natural gas fuel C stored in the natural gas tank 31 passes through the CNG pipe 36 and is regulated by the pressure regulating device (regulator) 33 through the electromagnetic valve 32 for its pressure. Then, while being controlled for its injection amount and injection timing by the CNG jet injector 35, the natural gas fuel C is injected into an intake system passage 65 (the intake passage 12 in FIG. 1).

Furthermore, in the present invention, when igniting the natural gas fuel C, the natural gas fuel C is combusted by compression ignition of the diesel fuel f injected into the combustion chamber 64 in the cylinder 70 without the use of a spark ignition system. Moreover, the present invention includes an exhaust gas introduction mechanism (not shown) that introduces the exhaust gas G into the cylinder 70 during an intake stroke.

Figure 3:
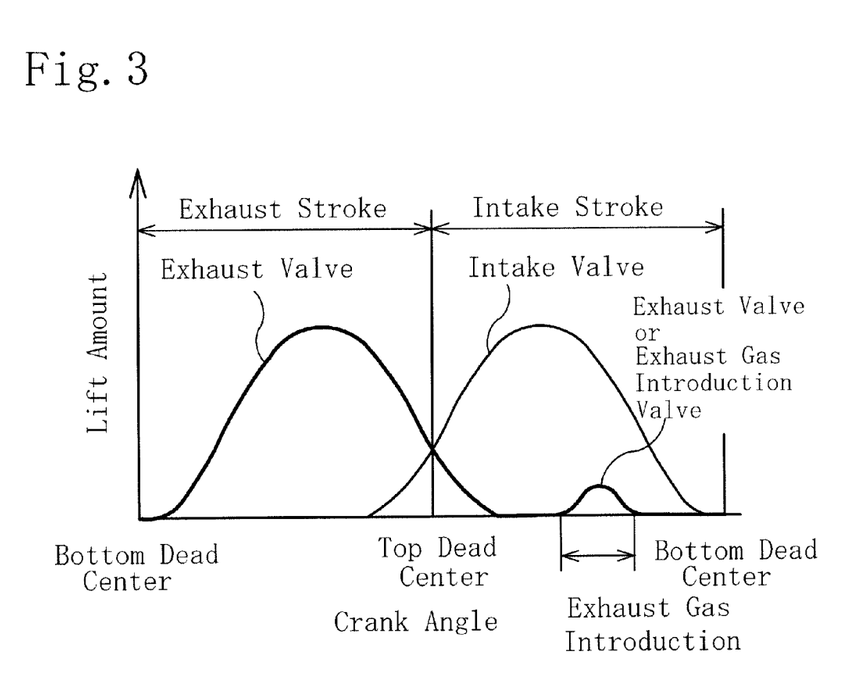
FIG. 3 is a diagram showing lifting of an intake valve and an exhaust valve during the exhaust gas introduction.

As the exhaust gas introduction mechanism, in an exhaust cam 68a that actuates an exhaust valve 68 shown in FIG. 2, an exhaust gas introduction cam profile having a phase angle of approximately 90° is formed in addition to a normal cam profile that opens the exhaust valve 68 during a normal exhaust stroke. The exhaust gas introduction cam profile can be actuated according to an engine operation region. Thus, as shown in FIGS. 2 and 3, by lifting and opening the exhaust valve 68 by about 1 mm to 3 mm during the intake stroke, the inside of the cylinder 70 and an exhaust system passage 67 (the exhaust passage 13 in FIG. 1) are communicated with each other. As a result, the exhaust gas G is introduced during the intake stroke.

Moreover, an exhaust gas introduction valve using an electromagnetic solenoid to actuate an on-off valve is provided separately from the exhaust valve 68, and a drive signal is given to the electromagnetic solenoid according to the engine operation region. Thus, by lifting and opening the exhaust gas introduction valve during the intake stroke at the timing as shown in FIG. 3, the inside of the cylinder 70 and the exhaust system passage 67 (the exhaust passage 13) are communicated with each other. As a result, the exhaust gas G is introduced during the intake stroke.

The operation of the exhaust gas introduction mechanism can increase the temperature of an air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat transmitted to the exhaust passage 13 is reduced, leading to reduction in heat damage and improvement in durability.

Moreover, an in-cylinder temperature can be quickly increased even at the start-up when the natural gas engine 10 is still cold. Thus, startability is improved. Also, at the start-up of the engine, the engine can be started with a small amount of diesel fuel f. Thus, accidental fires and unburned hydrocarbon emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel f is readily ignited, thus enabling stable ignition with a small amount of diesel fuel. Since stable combustion is performed with a small amount of fuels f and C even during a low load operation condition, ride quality (drivability) can be improved while reducing engine vibration. Also, the amount of exhaust gas can be reduced during the low load condition.

Moreover, in the present invention, a λ (excess air ratio) sensor 41 is provided on the downstream side of the turbine 15a in the exhaust passage 13 to enable measurement of the excess air ratio λ in the exhaust gas G. Furthermore, the exhaust shutter (exhaust throttle valve) 42 is provided on the upstream side of the turbine 15a in the exhaust passage 13.

Furthermore, a control device 51 called an engine control unit (ECU) is provided to control the diesel fuel injector 69, the CNG jet injector 35, the turbine 15a of the turbo supercharger 15, the intake shutter 17, the EGR valve 20 and the like by receiving signals from various sensors such as an accelerator sensor 52, an engine rotation speed sensor 53 and a coolant temperature sensor (not shown) provided in the engine main body 11, an intake air amount sensor (MAF: not shown) provided in the intake passage 12, the λ sensor 41, an exhaust gas temperature sensor (not shown), and an NOx sensor (not shown) provided in the exhaust passage.

Note that, in the configuration shown in FIG. 1, a bypass passage 13a is provided as a bypass of the exhaust passage 13. In the bypass passage 13a, a low-capacity compact continuous regeneration DPF 18d is provided, such as a DPF carrying an oxidation catalyst and a combination of an oxidation catalyst device and a DPF. Also, an exhaust channel switching valve 43 for switching the flow of the exhaust gas G between the bypass passage 13a and the exhaust passage 13 is provided in a portion, of the exhaust passage 13, parallel to the bypass passage 13a. The exhaust channel switching valve 43 is controlled by the control device 51. The exhaust gas G passes through the exhaust passage 13 in an opened state of the exhaust channel switching valve 43, and passes through the bypass passage 13a in a closed state thereof, before passing through the compact DPF 18d.

Next, description is given of an operation method for the natural gas engine 10 described above according to the embodiment of the present invention. The operation method for the natural gas engine is an operation method for the natural gas engine 10 in which the natural gas fuel C is injected into the intake passage 12, the diesel fuel f serving as an ignition source is injected into the cylinder 70, and when igniting the natural gas fuel C, the natural gas fuel C is combusted by compression ignition of the diesel fuel f injected into the cylinder 70 without the use of a spark ignition system, the natural gas engine 10 including an exhaust gas introduction mechanism that introduces the exhaust gas G into the cylinder 70 during an intake stroke. The operation method includes the step of performing control to facilitate ignition of the diesel fuel f by introducing, using the exhaust gas introduction mechanism, the exhaust gas G into the cylinder 70 during the intake stroke.

According to the operation method for the natural gas engine, the operation of the exhaust gas introduction mechanism can increase the temperature of an air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat propagated to the exhaust passage 13 is reduced, leading to reduction in heat damage and improvement in durability.

Figure 4:
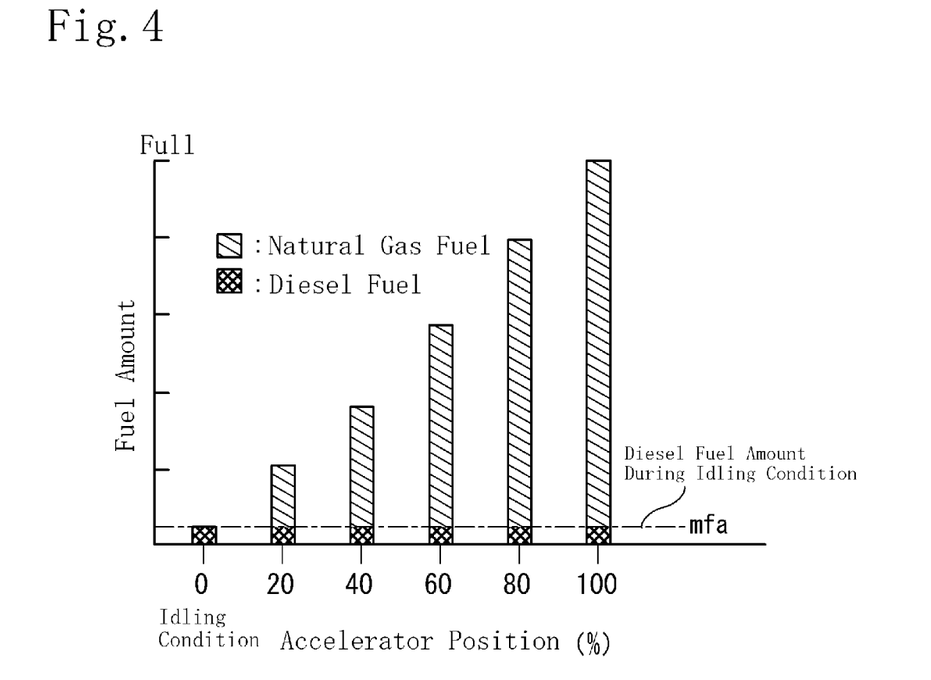
FIG. 4 is a diagram showing a relationship between diesel fuel and natural gas fuel in an operation method according to the present invention.

Furthermore, as shown in FIG. 4, control is performed in which an amount mf of the diesel fuel f injected into the cylinder 70 is set to a diesel fuel amount mfa for idling across the whole operation region of the natural gas engine 10, and engine output is increased and decreased by increasing and decreasing the amount of the natural gas fuel C.

According to the operation method, in the natural gas engine 10 including the exhaust gas introduction mechanism and simultaneously using the diesel fuel f, stable combustion can be maintained in an idling condition. Thus, the use of the combustion of the diesel fuel f for the ignition of the natural gas fuel C enables the natural gas fuel C to be combusted with the minimum amount of intake air and high combustion efficiency through a very simple control in which the diesel fuel amount is constant (mf=mfa) compared with a control in which a ratio of the diesel fuel f to the natural gas fuel C is changed according to the engine operation condition. Accordingly, the exhaust gas temperature can be increased with respect to the ratio of the amount of the fuels f and C. Thus, exhaust gas purification performance of the exhaust gas purification device 18 provided in the exhaust passage 13 can be improved. Note that the valve position of the intake shutter 17 in this case is controlled by measuring the air-fuel ratio, excess air ratio λ and oxygen concentrations in the exhaust gas G, and determining a stoichiometric ratio for stoichiometric combustion.

Moreover, by simultaneously performing intake throttle control using the intake shutter 17 provided in the intake passage 12 and exhaust throttle control using the exhaust shutter 42 provided in the exhaust passage 13 during the operation of the exhaust gas introduction mechanism, the exhaust gas can be allowed to more efficiently flow back into the cylinder 70. As a result, the in-cylinder temperature can be further increased, and the combustion efficiency can be further improved.

According to the natural gas engine 10 thus configured and the operation method for the natural gas engine, the operation of the exhaust gas introduction mechanism can increase the temperature of the air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat propagated to the exhaust passage 13 is reduced, leading to reduction in heat damage and improvement in durability.

Moreover, the in-cylinder temperature can be quickly increased even at the start-up when the natural gas engine 10 is still cold. Thus, startability is improved. Also, at the start-up of the engine, the engine can be started with a small amount of diesel fuel f. Thus, accidental fires and unburned HC emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel f is readily ignited, thus enabling stable ignition with a small diesel fuel amount mf. Since stable combustion is performed with a small amount of diesel fuel f even during a low load operation condition, ride quality (drivability) can be improved while reducing engine vibration. Also, the amount of exhaust gas can be reduced during the low load condition.

When the bypass passage 13a is provided in the exhaust passage 13 to provide the low-capacity DPF 18d for the low load condition, the capacity of the DPF 18d provided in the bypass passage 13a can be reduced to realize a compact size. Therefore, the compact DPF 18d can be disposed in a high-temperature portion closer to the engine main body 11. Thus, the amount of PM generated by diesel combustion in the exhaust gas G emitted into the atmosphere can be reduced. Note that, in a high load operation region a high exhaust temperature, the exhaust gas G is controlled to pass through a high-capacity DPF 18c with a catalyst on the downstream side, which is provided in the exhaust passage 13, rather than through the bypass passage 13a. Thus, exhaust resistance is small, and soot is removed.

According to the natural gas engine and the operation method for the natural gas engine according to the present invention, the operation of the exhaust gas introduction mechanism can increase the temperature of the air-fuel mixture of diesel fuel, natural gas fuel, intake air and exhaust gas inside the cylinder. Thus, stable compression combustion is performed even with a small diesel fuel amount, and the natural gas fuel can also be combusted in a stable manner. Accordingly, stable combustion can be realized. As a result, combustion efficiency is improved, and the amount of diesel fuel required for ignition is reduced. Thus, only a small amount of diesel fuel is required. Moreover, an amount of heat generated by combustion of the fuels is reduced as a whole. As a result, the amount of heat propagated to the exhaust passage is reduced, leading to reduction in heat damage and improvement in durability. Therefore, the natural gas engine and the operation method for the natural gas engine according to the present invention can be used for many vehicle-mounted natural gas engines and an operation method for the natural gas engines.

The invention claimed is:

1. A natural gas engine in which an amount of natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without a spark ignition system, comprising:
   an exhaust gas introduction mechanism that introduces exhaust gas into the cylinder during an intake stroke by allowing the exhaust gas to flow back into the cylinder by opening an exhaust valve,
   wherein an amount of the diesel fuel to be injected into the cylinder is set to a constant amount for idling across an entire operation region of the natural gas engine, and
   wherein output of the engine is increased and decreased by increasing and decreasing, respectively, the amount of the natural gas fuel.

2. The natural gas engine according to claim 1, further comprising:
   an intake shutter in the intake system passage,
   wherein the engine is configured to simultaneously perform intake throttle control using the intake shutter when the exhaust gas introduction mechanism introduces the exhaust gas into the cylinder.

3. The natural gas engine according to claim 1, further comprising:
   an exhaust shutter in an exhaust system passage,
   wherein the engine is configured to simultaneously perform exhaust throttle control using the exhaust shutter when the exhaust gas introduction mechanism introduces the exhaust gas into the cylinder.

4. An operation method for a natural gas engine in which an amount of natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without a spark ignition system, comprising:
   providing an exhaust gas introduction mechanism that introduces exhaust gas into the cylinder during an intake stroke by allowing the exhaust gas to flow back into the cylinder by opening an exhaust valve;
   setting an amount of diesel fuel to be injected into the cylinder to a constant amount for idling across an entire operation region of the natural gas engine; and
   increasing and decreasing output of the engine by increasing and decreasing, respectively, the amount of the natural gas fuel.

5. The operation method for a natural gas engine, according to claim 4, further comprising:
   performing intake throttle control using an intake shutter provided in the intake system passage and exhaust throttle control using an exhaust shutter provided in an exhaust system passage when the exhaust gas introduction mechanism introduces the exhaust gas into the cylinder.

* * * * *